United States Patent
Bhatoolaul et al.

(10) Patent No.: US 7,286,500 B1
(45) Date of Patent: Oct. 23, 2007

(54) CODE DIVISION MULTIPLE ACCESS SYSTEM HAVING IMPROVED PILOT CHANNELS

(75) Inventors: David Lahiri Bhatoolaul, Grange Park (GB); Lorenz Fred Freiberg, Swindon (GB)

(73) Assignee: Lucent Technologies Inc., Murray Hill, NJ (US)

( * ) Notice: Subject to any disclaimer, the term of this patent is extended or adjusted under 35 U.S.C. 154(b) by 838 days.

(21) Appl. No.: 10/019,702

(22) PCT Filed: Jun. 6, 2000

(86) PCT No.: PCT/EP00/05098

§ 371 (c)(1),
(2), (4) Date: Dec. 27, 2001

(87) PCT Pub. No.: WO01/03318

PCT Pub. Date: Jan. 11, 2001

(30) Foreign Application Priority Data

Jul. 2, 1999 (EP) .................................. 99305246

(51) Int. Cl.
*H04B 7/216* (2006.01)
*H04B 1/10* (2006.01)

(52) U.S. Cl. ...................... 370/320; 370/335; 370/342; 375/348

(58) Field of Classification Search ................. 370/320, 370/335, 342, 479, 491, 500; 375/346, 348, 375/325
See application file for complete search history.

(56) References Cited

U.S. PATENT DOCUMENTS

| | | | |
|---|---|---|---|
| 5,544,156 A * | 8/1996 | Teder et al. ................. | 370/342 |
| 5,862,453 A | 1/1999 | Love | |
| 6,154,659 A * | 11/2000 | Jalali et al. ................. | 455/522 |
| 6,192,040 B1 * | 2/2001 | Jalloul et al. ............... | 370/335 |
| 6,304,563 B1 * | 10/2001 | Blessent et al. ............ | 370/335 |
| 6,370,131 B1 * | 4/2002 | Miya .......................... | 370/335 |
| 6,393,010 B1 * | 5/2002 | Lunby et al. ............... | 370/342 |
| 6,400,700 B1 * | 6/2002 | Miya et al. ................. | 370/335 |
| 6,519,296 B1 * | 2/2003 | Hladik ....................... | 375/325 |
| 6,535,502 B1 * | 3/2003 | Brink .......................... | 370/345 |
| 6,647,003 B1 * | 11/2003 | Abeta et al. ................ | 370/335 |

(Continued)

FOREIGN PATENT DOCUMENTS

EP 0795969 A2 9/1997

(Continued)

OTHER PUBLICATIONS

Database WPI, XP-002124380, Section EI week, 199920.

(Continued)

*Primary Examiner*—Wellington Chin
*Assistant Examiner*—Ahmed Elallam

(57) ABSTRACT

In a CDMA network, each mobile is arranged to combined pilot symbols from its dedicated pilot channel with pilot symbols from at least one common channel as an input to its channel impulse response sensing means. The common channel may be a BCH, a FACH or a PCH, and the pilot symbols on all such channels may be combined. The pilot energy required on each dedicated pilot channel can thereby be reduced. By communicating the quality of the received pilot symbols to a base station, the base station can reduce the energy on the dedicated pilot channel, providing a yet further saving of energy.

4 Claims, 6 Drawing Sheets

U.S. PATENT DOCUMENTS

| | | | |
|---|---|---|---|
| 6,721,299 B1 * | 4/2004 | Song | 370/342 |
| 6,766,146 B1 * | 7/2004 | Park et al. | 455/69 |
| 2002/0186677 A1 * | 12/2002 | Leung | 370/342 |
| 2004/0252796 A1 * | 12/2004 | Dabak et al. | 375/347 |

FOREIGN PATENT DOCUMENTS

| | | |
|---|---|---|
| JP | 11331042 | 11/1999 |
| WO | WO 99/13675 | 3/1999 |
| WO | WO 99/18702 | 4/1999 |

OTHER PUBLICATIONS

Performance Comparison between Time-Multiplexed Pilot Channel & Mobile Radio. Abeta et al. Nov. 1997.

* cited by examiner

CODE DIVISION MULTIPLE ACCESS SYSTEM HAVING IMPROVED PILOT CHANNELS

FIELD OF THE INVENTION

This invention relates to a code division multiple access (CDMA) system, especially a wide band or direct sequence (DS) CDMA system, and relates particularly to the arrangements for providing pilot channels.

BACKGROUND OF THE INVENTION

For effective use of direct sequence CDMA systems for digital mobile cellular telephone and personal communication network applications, a detection technique must be used which performs well at low signal to interference ratios. Coherent detection is preferred to non-coherent detection because it has better performance in the slow fading environments which typify personal communication channels. To apply coherent detection, the channel impulse response at a receiver must be known, and this can be achieved by transmitting pilot symbols.

Pilot symbols can be transmitted in two ways; a) a dedicated pilot channel, i.e. one pilot channel for each user, in which pilot symbols are embedded periodically (time- or code-multiplexed) in the same channel as the data symbols, or b) a common pilot channel, i.e. one pilot channel for all users, in which pilot symbols are continuously sent on a separate channel in parallel with data channels.

An advantage of dedicated pilot channels is that power can be varied, so that a mobile at a boundary of a cell can ramp up the power of its received symbols to overcome channel propagation as well as fast fading; however the system relies on good ≋statistical multiplexing≋ of users to ensure that there is always spare transmitter capacity to meet a sudden demand from a mobile for increased power, which can create instability.

The well known differences between the two arrangements will now be described with reference to FIGS. 1-6.

FIG. 1a shows the sector coverage angle alpha (e.g. 30° to 40°) over which a small base station transmits. FIG. 1b indicates by the enclosed area the energy $E_d$ required to transmit data, and this is assumed to be constant. FIG. 1c indicates by the shaded area the energy $E_p$ required to transmit pilot symbols in either a dedicated pilot channel or a common pilot channel.

FIG. 2 illustrates energy requirements in a common pilot channel arrangement, and is effectively a merger of FIGS. 1b and 1c; a single continuous pilot channel is broadcast to all users.

FIG. 3 illustrates energy requirements in a dedicated pilot channel arrangement; each of the N users (where N±5) has a different energy requirement E1 to E5, shown by the shaded and crosshatched areas. The total energy requirement for the pilot channels is $N*E_p$. This arrangement assumes there is no power control facility to vary power transmission.

FIG. 4 shows a variation of FIG. 3 including a power control facility. The power supplied to each pilot channel can be controlled individually, as indicated by the different areas of the shaded and crosshatched bands E6 to E10. At certain times, in theory, the pilot in a channel can even be switched off completely, saving energy, and allowing other data or control information to be transported by that channel. Pilot energy requirement is $\Sigma E_{p,i} \cdot \beta_i$ where $\beta_i$ is the scaling factor for each user, dependant on power control and time multiplexing. $\beta$ is between 1 and 0, i.e. it is small when a mobile is close to its base station.

However comparison with FIG. 1c shows that the total power used is unchanged.

FIG. 5 indicates energy requirements where spatially adaptive antennas are used. Data energy is transmitted in much narrower sections α1 to α4 within the sector angle α, i.e. a beam forming technique is used. The narrow sectors α1 to α4 are directed towards active mobiles, and the pilot energy required for each narrow sector is also varied in accordance with need, as indicated by the shaded areas. The total energy requirement is greatly reduced. The pilot energy requirement is $$\sum_i^N \beta_i E_p G_A$$

where $G_A$ is the gain of the directed antennas.

FIG. 6 shows that, in addition to the directed channels of FIG. 5, some common channel facility is required across the whole sector angle α, e.g. for mobiles attempting to make a call, and the data power for this is indicated at $E_{dc}$, between the directed sectors with the associated pilot energy indicated by the cross-hatched areas $E_{pc}$. Pilot energy requirements are $$\sum_i^N \beta_i E_p G_A + \sum_i^C \beta_i E_p,$$

where C is the number of common channels.

BRIEF SUMMARY OF THE INVENTION

It is the object of the invention to provide a pilot channel arrangement having reduced energy requirements.

According to the invention in a code division multiple access mobile radio telecommunications network, a method of providing pilot symbols comprises providing a first set of pilot symbols through a plurality of pilot channels, each such channel being dedicated to one mobile user; providing a second set of pilot symbols through at least one common control channel; and in a mobile combining the first and second sets of pilot symbols and providing said combination to channel impulse response sensing means.

In effect the common pilot energy $$\sum_i^C \beta_i E_p$$

is use by a mobile in addition to pilot energy provided on its dedicated pilot channel.

The common control downlink channel may be a broadcast channel or a forward access channel or a paging channel.

Also according to the invention a code division multiple access mobile radio telecommunications network comprising a plurality of mobiles each having a dedicated pilot channel; a plurality of base stations; first pilot symbol generation means arranged to supply pilot symbols to each dedicated pilot channel; second pilot symbol generation means arranged to supply to at least one common control channel dedicated pilot symbols embedded between data symbols broadcast by the common control channel; and in each mobile receiving means arranged to receive pilot symbols in the dedicated pilot channel and the common control channel, combining means to combine the received pilot symbols, channel estimation means to process the combined pilot symbols, and coherent detection means arranged to vary at least one property of the mobile in accordance with the output of the channel estimation means.

The invention will now be described by way of example with reference to FIGS. 7 to 10 in which:—

DETAILED DESCRIPTION

Figure 7:
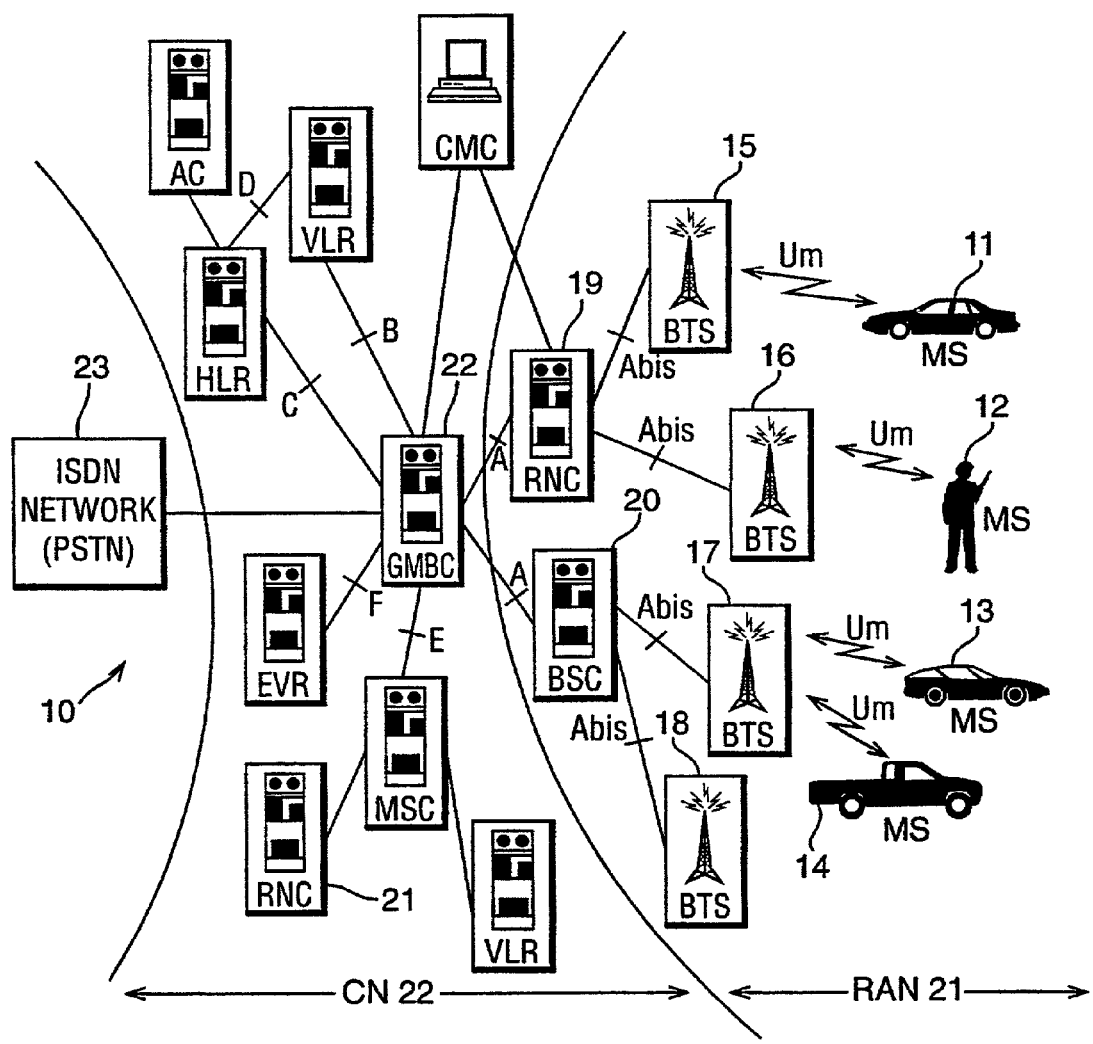
FIG. 7 is a schematic drawing of a DS CDMA network.

In FIG. 7 a wireless telecommunication system 10 comprises a number of mobile stations (MS) 11,12,13,14 and a number of base transceiver stations N node B 15,16,17,18 connected through a radio network controller (RNC) 19,20 (all in the radio access network RAN 21) to a core network (CN) 22. The CN is connected to the public switched telephone network PSTN 23.

In FIG. 7, each mobile 12 is provided with a dedicated pilot channel which carries pilot symbols to the mobile; the mobile uses these symbols to determine the extent of some of the key radio channel effects on desired transmitted signal to the mobile.

Examples of these radio channel effects are:
i) Offset in frequency due to the well known mobile radio channel Doppler effect;
ii) Offset in timing synchronization due to multipath propagation;
iii) Energy loss in the transmitted signal due to propagation loss and fast-fading induced by multipath propagation.

With a knowledge of the extent of key radio channel phenomena the mobile can configure the various functions/processes/schemes that demodulate the received signal, such as the timing and tracking synchronization and channel estimation, to minimize the distortion caused by radio channel phenomena. In addition, the mobile can provide feedback to the network, suggesting means to vary certain characteristics of its downlink reception and demodulation.

In the system illustrated in FIG. 7, as is well known, there are a number of common control channels in the downlink which are commonly broadcast by the network; such channels typically include a broadcast channel BCH, a forward access channel FACH and a paging channel PCH.

The BCH is used to provide cell-specific information, such as the cell identity and the available short and long codes for random access channel RACH transmission; information about neighbouring cells can also be provided. In the majority of cell scenarios the information carried by the BCH can be assumed to be static for the duration of most telephone calls.

The FACH is primarily used to carry initial call set-up control information to a mobile when the system knows the location cell of the mobile. The FACH can also carry short intermittent packet information.

The PCH is used to carry information primarily to initiate network originated calls, eg from a landline telephone, to a mobile station when the system does not know the location cell of the mobile. The PCH may have a ❋sleep mode❋ when traffic is low.

These and other common control channels are separated from one another by channelisation codes, and possibly also be fixed time-offsets.

In the arrangement there is no common pilot channel, therefore each channel in addition has its own dedicated pilot symbols which are embedded at regular intervals between the transmitted data symbols.

In the present invention a mobile 12 utilises the pilot symbols in existing common downlink channels in addition to the pilot symbols provided by its own dedicated pilot channel or channels. By use of such a combination decreased energy is required in the dedicated pilot channel of the mobile.

Figure 8:
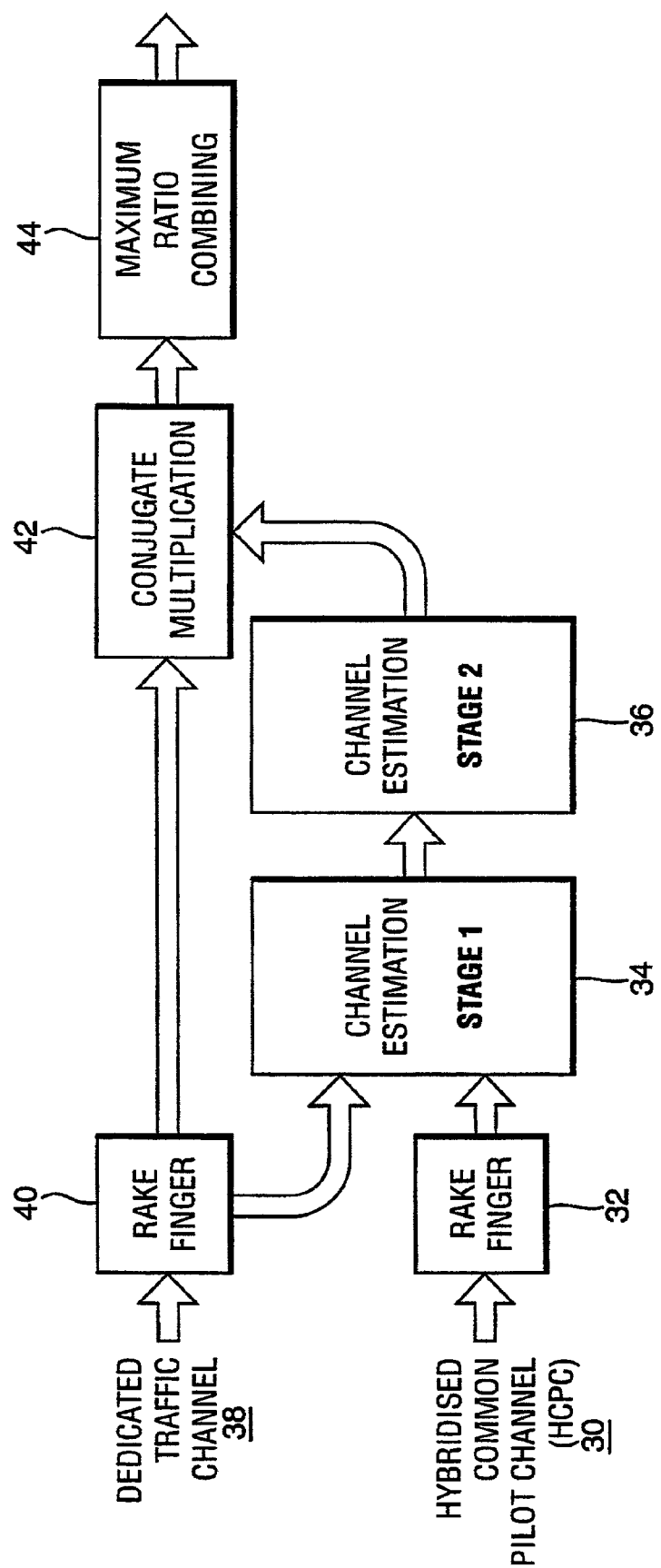
FIG. 8 indicates the energy extraction process in a method according to the invention.

FIG. 8 shows the energy flows. The pilot channel of the mobile 12 is referred to as a hybridised common pilot channel HCPC 30, and pilot information from it flows through a first rake finger 32 to a channel estimator in two stages 34, 36. Pilot information from at least one of the downlink channels, indicated at 38 as a dedicated traffic channel, passes through a second rake finger 40 to the channel estimators 34, 36. (Although two sets of rake fingers are shown, in practice only one may be needed). The output of the estimators 34, 36 passes to a conjugate multiplication stage 42 which also receives input directly from the dedicated traffic channel, and then to a maximum ratio combining stage 44. The output of the combining stage, connected to the processor of the mobile, indicates channel impulse response of the mobile's receiver, and permits use within the mobile of coherent detection techniques.

The channel estimation functional units 34,36, are shown in two stages to indicate the possibilities of:
i) Combining in stage 34 the de-spread pilot symbol energy from the dedicated traffic channel and Hybridised Common Pilot Channel sources to create effectively a single pilot source which is then used to estimate the extent of channel distortion in stage 36;
ii) Independently calculating channel estimates from the two despread pilot symbol sources in stage 34 and then combining the two resultant sets of channel estimates in stage 36.

The channel estimates produced by the channel estimation functional units 34,36 are used by the conjugate multiplication stage 42 to mitigate the effects of channel distortion on the desired de-spread signal using coherent detection.

Figure 1A:
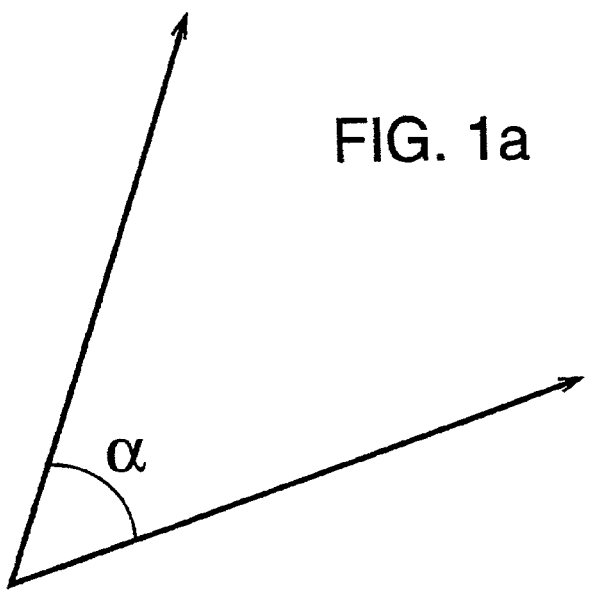
FIGS. 1-6 illustrate the differences between arrangements using dedicated pilot channels and arrangements using a common pilot channel.
Figure 1B:
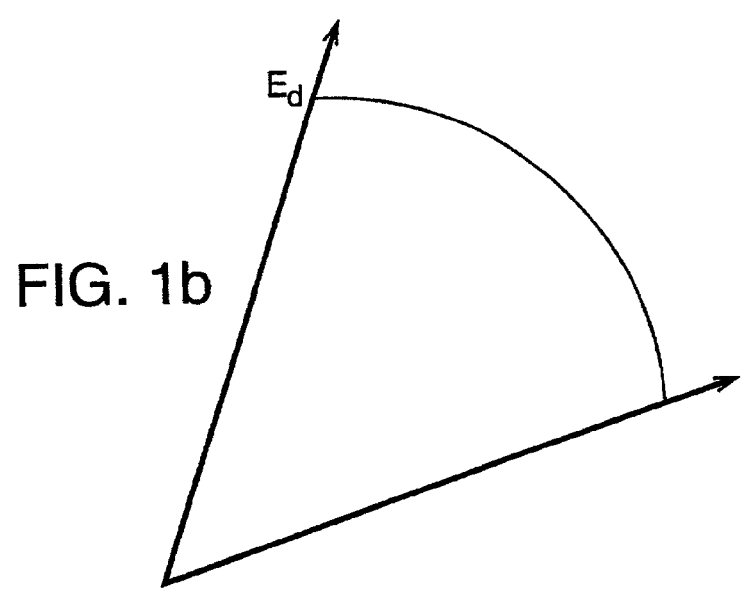
Figure 1C:
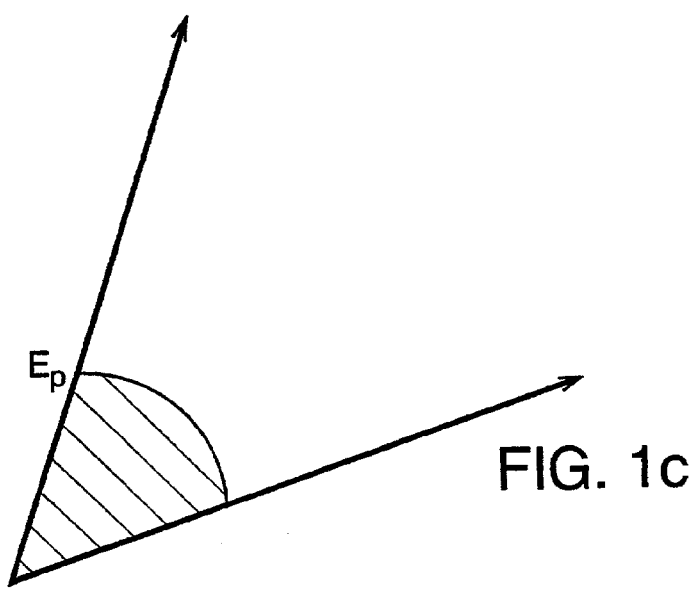
Figure 2:
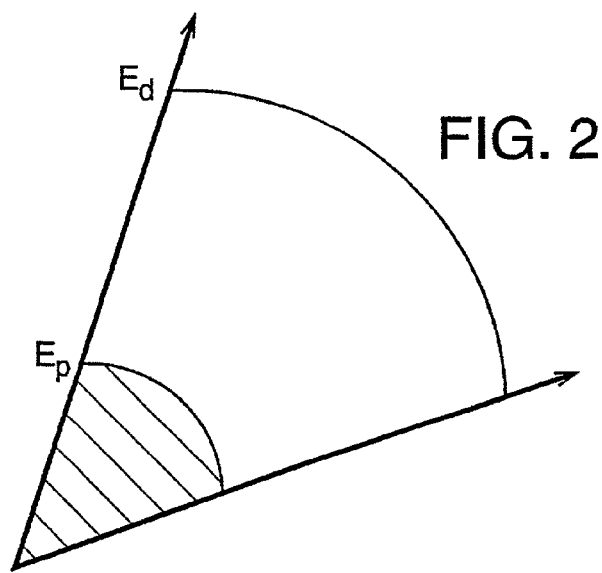
Figure 3:
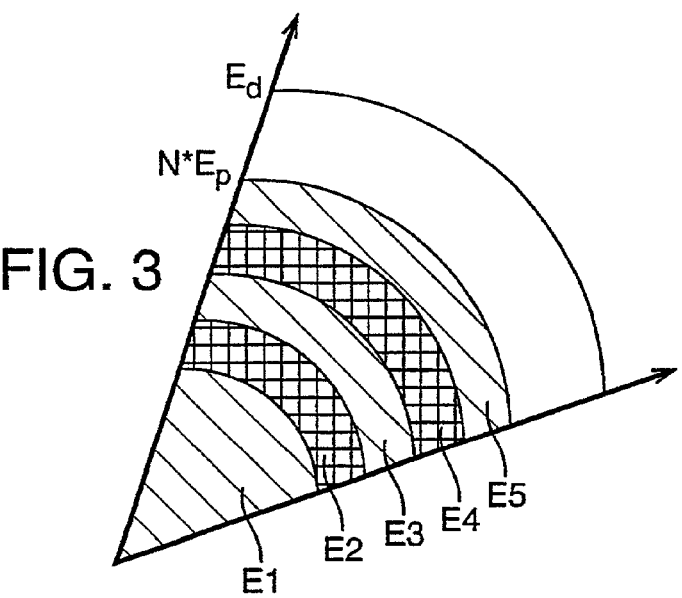
Figure 4:
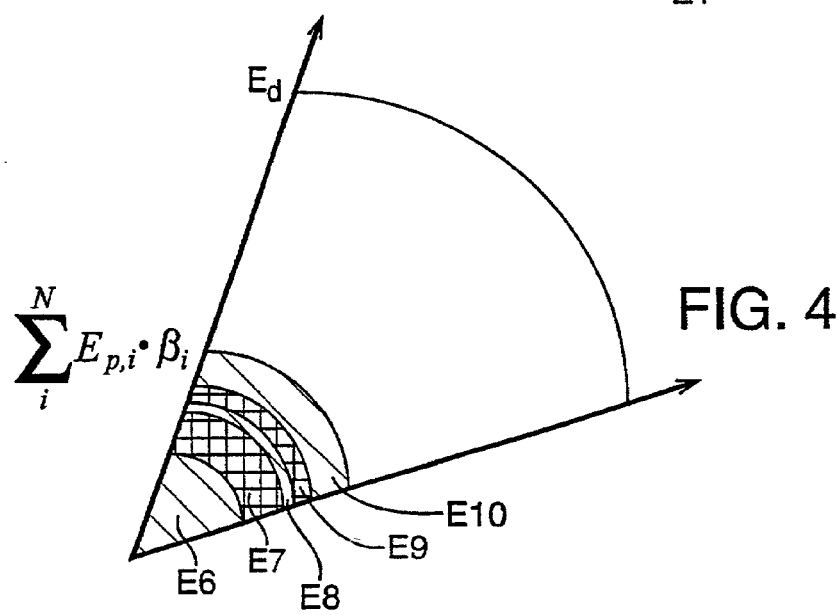
Figure 5:
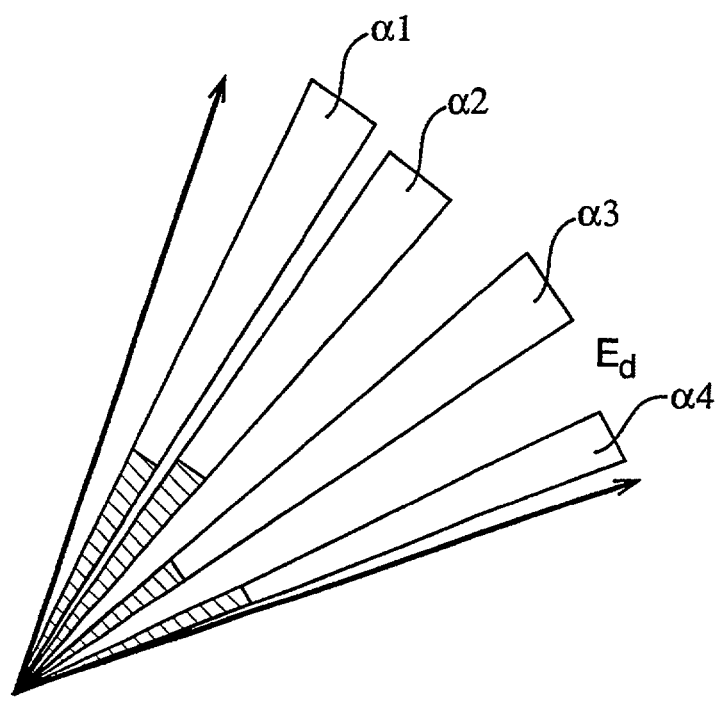
Figure 6:
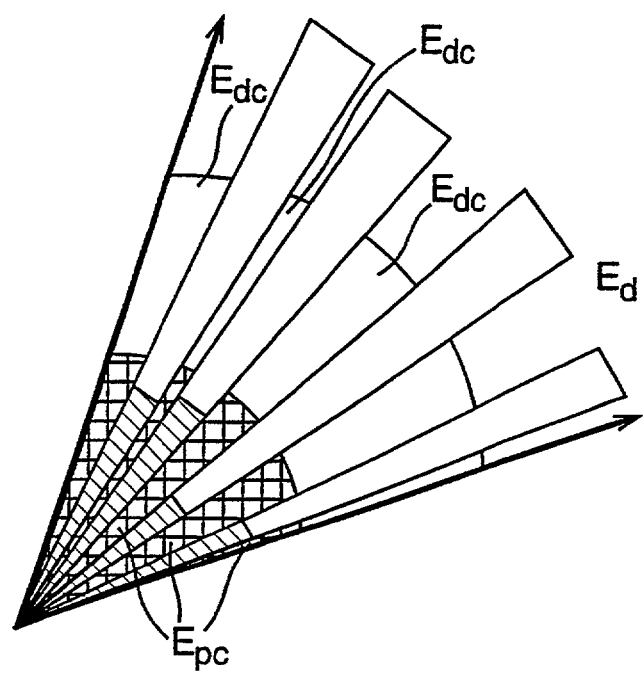

The use of information from at least one broadcast channel allows lower pilot energy input through the hybrid channel, i.e. in FIG. 2, $E_p$ can be reduced.

Usually there will exist an almost continuous stream of pilot symbols from the available downlink several common control channels such as the BCH, FACH, and PCH. Since all the channels experience the same channel conditions, the mobile can obtain accurate and robust multi-path tracking information, as well as channel estimates.

The energy flow arrangement illustrated in FIG. 8 applies when there is a non-zero offset between the two sets of pilots; the parallel receiver structure allows the two sets of pilot symbols to be demodulated in parallel.

If there is no time offset between the two sets of pilot symbols, parallel pilot symbol energy flows such as illustrated in FIG. 8 will not be necessary, and a sub-set of existing rake fingers can be allocated to demodulate just the multipath components which are deemed to require extra robust ※channel estimation※; this requires additional rake finger management.

Figure 9:
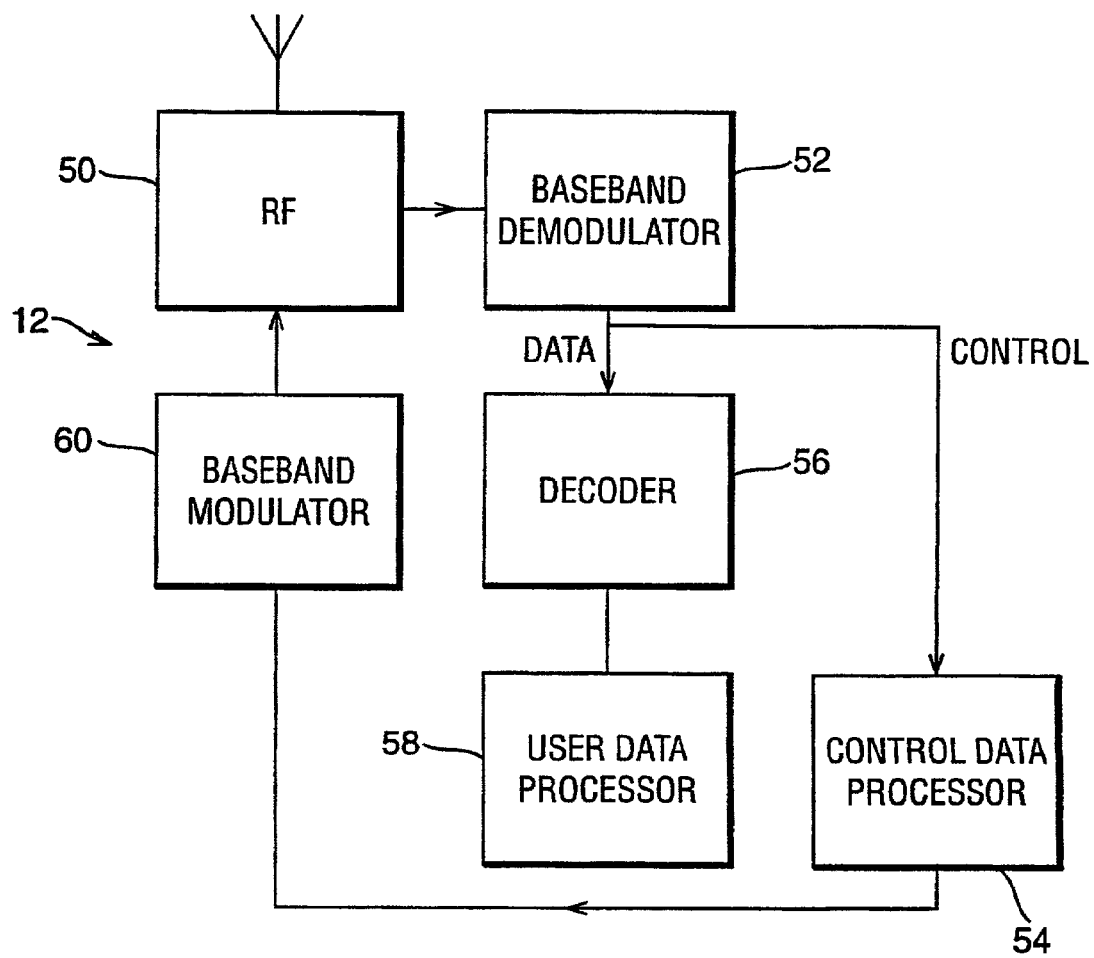
FIG. 9 shows in more detail one of the mobiles of FIG. 7, operating according to the invention.

A typical mobile 12 is shown in FIG. 9. It has a RF transceiver 50 connected to a baseband demodulator 52 which passes control data to a control signal processor 54 and data signals to a decoder connected to a user data processor 58.

A further reduction in pilot energy can be achieved by incorporation of base station (BTS) intervention. The mobile 12 is arranged to provide feedback signals to the BTS about the quality of its HCPCH, ie the noise or power or phase rotation of the pilot symbols. The BTS can then reduce the power of the pilot symbols in the mobile's dedicated pilot channel in comparison with the power of the data symbols. A further advantage of such a power variation is that, depending on the cell scenario, it will reduce the overall power transmitted by a BTS on the downlink, which for a multi-user CDMA system (FIG. 7) improves the downlink capacity.

To provide BTS intervention, additional parts of the mobile 12 are affected; referring to FIG. 9, the control data processor provides the required information to the BTS by a loop to the base band demodulator 60 in the mobile, its output being connected to the RF transceiver 50.

A yet further improvement is provided by adapting one of the common channels, using the BTS intervention arrangement described above. The channel and tracking estimation stages, 34, 36 in FIG. 8, are arranged to estimate the performance gains from the HCPCH; this performance gain can be improved by adapting the time-offsets between the pilot symbols belonging to the common channel(s) being used to generate the HCPC and the pilot symbols transmitted on the dedicated traffic channel(s) to suit channel conditions. In most circumstances it will be preferable to have the HCPCH pilot aligned in time with the DTCH to simplify the channel estimation combining process represented by 34,36. However, in some circumstances, e.g. when the channel is varying very quickly, it will be preferable to have the HCPCH pilots occurring half-way between DTCH pilots; this can significantly improve multi-path tracking performance.

Figure 10:
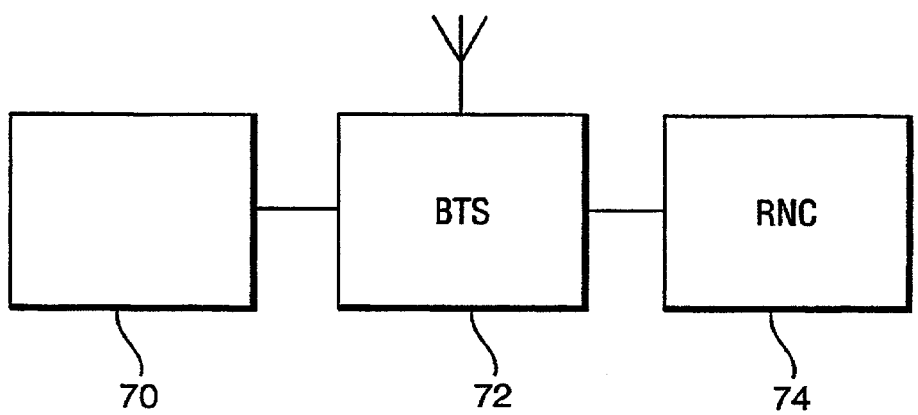
FIG. 10 shows in more detail one of the base stations of FIG. 7, operating according to the invention.

Such an arrangement affects a base station BTS; a typical arrangement is shown in FIG. 10 in which a mobile 70 is connected to a BTS 72 which is controlled by a RNC 74. The RNC 74 controls the timing of the pilot symbols in the common channels which provide inputs as dedicated traffic channel energy in FIG. 8, and can therefore vary the timing of the symbols with respect to the dedicated pilot channel symbols, as required.

Instead of shifting the timing of the pilot symbols in the common channels, in another variation the RNC 74 can be arranged to substitute pilot symbols for data symbols on common channels such as the FACH or PCH to create Extended HCPC (EHCPC) channels. Doing this trades-off common channel capacity (eg the number of calls that can be set up or acknowledged in a unit of time) for improved channel estimation at a mobile.

Alternatively without the need for RNC intervention, the mobile can use the effectively static data symbols on a common channel such as the BCH as pilot symbols to create EHCPC. A mobile must always listen to such a channel for new calls, or for a paging service message, and such channels are rarely congested.

The invention claimed is:

1. In a code division multiple access mobile radio channel communications network, a method of providing pilot symbols comprises: providing a first set of pilot symbols through a plurality of dedicated pilot channels, each dedicated pilot channel being dedicated to one mobile user; simultaneously providing a second set of pilot symbols through at least one common control channel, said common control channel also carrying data symbols in addition to said second set of pilot symbols; and in a mobile combining the first and second sets of pilot symbols and from said combination estimating the channel impulse response; and further comprising transmitting from a mobile to a network base station information relating to quality of received pilot symbols, the base station then varying the energy associated with the first set of pilot symbols supplied to that mobile, and further comprising the step of varying time offsets between pilot symbols on the dedicated pilot channel and pilot symbols on the at least one common channel.

2. A method according to claim 1 in which the common control channel is one of a broadcast channel or a forward access channel or a paging channel.

3. A code division multiple access mobile radio telecommunications network comprising a plurality of mobiles each having a dedicated pilot channel; a plurality of base stations; first pilot symbol generation means arranged to supply pilot symbols to the dedicated pilot channels; second pilot symbol generation means arranged to supply to at least one common control channel dedicated pilot symbols embedded between data symbols broadcast by the common control channel; and in each mobile, receiving means arranged to receive pilot symbols in the dedicated pilot channel and the common control channel, combining means to combine the received pilot symbols, channel estimation means to receive the combined pilot symbols, and coherent detection means arranged to vary at least one property of the mobile in accordance with the output of the channel estimation means, and in which each mobile is arranged to send to an associated base station information relating to the quality of pilot symbols received on its dedicated pilot channel, and each base station is arranged to vary the energy of said pilot symbols accordingly and in which each mobile is further arranged to send to an associated base station information relating to the quality of pilot symbols received on the at least one common channel, and each base station is arranged to vary the timing of the pilot symbols in the common control channel with respect to the pilot symbols in the dedicated pilot channel.

4. In a code division multiple access mobile radio channel communications network, a method of providing pilot symbols comprises: providing a first set of pilot symbols through a plurality of dedicated pilot channels, each dedicated pilot channel being dedicated to one mobile user; simultaneously providing a second set of pilot symbols through at least one common control channel, said common control channel also carrying data symbols in addition to said second set of pilot symbols; and in a mobile combining the first and second sets of pilot symbols and from said combination estimating the channel impulse response, in which the common control channel is one of a broadcast channel or a forward access channel or a paging channel, and further comprising transmitting from a mobile to a network base station information relating to quality of received pilot symbols, the base station then varying the energy associated with the first set of pilot symbols supplied to that mobile, and further comprising the step of varying the time offsets between pilot symbols on the dedicated pilot channel and pilot symbols on the at least one common channel.

* * * * *